(12) United States Patent
Gu et al.

(10) Patent No.: US 12,196,537 B2
(45) Date of Patent: Jan. 14, 2025

(54) INTRINSICALLY SAFE INTELLIGENT MANUFACTURING SYSTEM FOR PERFORATING BULLETS

(71) Applicant: Hefei Haide Intelligent Technology Co., Ltd., Anhui (CN)

(72) Inventors: Yuhong Gu, Anhui (CN); Bin Huang, Anhui (CN); Xuqiang Song, Anhui (CN); Yuan Xu, Anhui (CN); Zhaoyu Du, Anhui (CN); Fenglong Zhang, Anhui (CN)

( * ) Notice: Subject to any disclaimer, the term of this patent is extended or adjusted under 35 U.S.C. 154(b) by 0 days.

(21) Appl. No.: 18/232,594

(22) Filed: Aug. 10, 2023

(65) Prior Publication Data

US 2024/0200920 A1    Jun. 20, 2024

(51) Int. Cl.
*F42B 33/02*        (2006.01)
*F42B 33/00*        (2006.01)

(52) U.S. Cl.
CPC ............ *F42B 33/001* (2013.01); *F42B 33/02* (2013.01)

(58) Field of Classification Search
CPC .................................................... F42B 33/001
See application file for complete search history.

(56) References Cited

U.S. PATENT DOCUMENTS

| 2018/0335286 A1* | 11/2018 | Gatti | F42B 33/001 |
| 2019/0063890 A1* | 2/2019 | Abel | F42B 33/0285 |
| 2020/0041242 A1* | 2/2020 | Gatti | F42B 33/0207 |

* cited by examiner

Primary Examiner — J. Woodrow Eldred

(57) ABSTRACT

The invention discloses an intrinsically safe intelligent manufacturing system for perforating bullets, which relates to the technical field of automatic production of perforating bullets, including an automatic weighing unit for explosives, a material conveying unit, a multi-station automatic pressing and assembling unit for perforating bullets, a tooling for pressing fire prevention and Alarm unit, explosion-proof armor unit, cleaning unit, glue coating unit on the mouth of perforating bullets, product QC intelligent IA inspection unit, product placement unit and explosion-proof isolation warehouse interlock unit. The invention can complete explosive weighing, loading, material conveying, automatic assembly, multi-station pressing, safety protection, mold cleaning, perforating bullet cleaning, cleaning, perforating bullet glue coating, product QC intelligent IA inspection, Product arrangement and delivery of finished products constitute the manufacturing flow operation of perforating bullet production, realizing key technologies such as unmanned manufacturing of perforating bullets, new-type perforating bullet manufacturing special equipment and intelligent equipment system integration, and completing the intrinsically safe intelligent manufacturing of perforating bullets safety design.

1 Claim, 1 Drawing Sheet

INTRINSICALLY SAFE INTELLIGENT MANUFACTURING SYSTEM FOR PERFORATING BULLETS

TECHNICAL FIELD

The invention relates to the technical field of automatic production of perforating bullets, in particular to an intrinsically safe intelligent manufacturing system for perforating bullets.

BACKGROUND TECHNIQUE

At present, most of the perforating bullet manufacturers in our country adopt semi-automatic production mode, and the equipment automation degree is low. The material transfer between the operation station and the perforating bullet pressing station is carried out manually through the explosion-proof window, and only the steel plate protection is used between the man and the equipment, the psychological pressure of the operator is relatively high.

The entire civil explosives industry, including perforating bullets, urgently needs to convert existing production methods to new and old kinetic energy, improve the performance and safety of intelligent manufacturing of production lines, and meet the future development needs of perforating bullets. Taking intelligent manufacturing of perforating bullets as a breakthrough and aiming at intelligent manufacturing, building a brand-new intelligent factory, destroying the old and establishing the new, and establishing equipment reliability and quality assessment standards or specifications that meet the safety production of the civil explosive industry are crucial to accelerating automation, unmanned, and intelligent production. The promotion and application of complete sets of equipment in the civil explosive industry is of great significance to improve the intrinsic safety level of the production process.

Therefore, it is necessary to invent an intrinsically safe intelligent manufacturing system equipment for perforating bullets to solve the above problems.

CONTENTS OF THE INVENTION

The main purpose of the present invention is to provide an intrinsically safe intelligent manufacturing system for perforating bullets, which can effectively solve the problems in the background technology.

In order to achieve the above object, the technical scheme that the present invention takes is:

An intrinsically safe intelligent manufacturing system for perforating bullets, including an automatic weighing unit for explosives, a material conveying unit, a multi-station automatic pressing assembly unit for perforating bullets, a tooling pressing fire prevention and alarm unit, an explosion-proof armor unit, a cleaning unit, and a perforating bullet Gluing unit at the edge of the mouth, product QC intelligent IA inspection unit, product placement unit and explosion-proof isolation warehouse interlocking unit;

The explosive automatic weighing unit is composed of a material hopper, a drug guiding device, a composite servo feeding and conveying device, a charging mechanism, a high-precision weighing and measuring device, a temporary storage hopper, a position conversion device, a charging channel, a waste collection hopper, a powder prevention The splash device is used to realize the precise measurement, servo feeding and explosion-proof treatment technology of the automatic weighing process of granular dangerous goods;

The material conveying unit is composed of a low-speed explosion-proof double-speed conveying line, a jacking and traversing mechanism, an explosion-proof drive unit and an electrical control unit. The material conveying unit is responsible for conveying the charged shells of the explosive automatic weighing unit to the perforating bullets of the explosion-proof robot assembly position in the multi-station at the automatic pressing assembly unit;

The perforating bullet multi-station automatic pressing assembly unit is composed of a special hydraulic press for perforating bullets, an explosion-proof robot, an AI positioning system, a multi-station pressing assembly platform, a pick-and-place mechanism for a centralizing sleeve and a liner, and a ring-shaped synchronous conveying line. It is used to grab the drug shell and drug-type cover from the material tray, place them on the corresponding tooling mold according to the assembly process, and is also used for the assembly process of placing, transferring, and taking out the righting sleeve. The AI positioning system is used for Identify the position of the drug case and the drug-type cover, guide the robot to accurately locate and place the drug case and the drug-type cover. Composed of a composite secondary positioning mechanism, the multi-station pressing platform is installed on the side of the workbench of the special hydraulic press for perforating charges, and the position conversion of various assembly processes before the pressing process is completed through platform lifting and rotating stations. The pressing platform is equipped with stations such as upper shell, putting the centralizing sleeve, putting the cover, pressing, taking the bullet and cleaning. Each station is equipped with a mold, a die, and a middle mold to realize automatic and assembly line continuous pressing production. The taking-and-placing mechanism of the centralizing sleeve and drug-type cover is composed of an explosion-proof servo module, an explosion-proof servo motor, a driver, a guiding and positioning device, and a clamping mechanism. Grab the centralizing sleeve at one position, place the cleaning mechanism, and then move the centralizing sleeve to the multi-station pressing platform to put the centralizing sleeve station after cleaning. After the cover is in place, the liner is placed in the shell, and multiple stations are set on the circular synchronous conveyor belt to complete various processes such as edge cleaning, cleaning, body appearance inspection, and glue application of various perforating bullets;

The tool pressing fire protection and alarm unit is composed of isolation device, fire extinguishing material and alarm device, the isolation device and fire extinguishing material are arranged around the pressing tool mold, which can realize fire prevention such as closing, blocking, isolation, flame retardant, energy absorption, covering, etc., action, forming passive fire protection, and triggering alarm information in time;

The explosion-proof armor unit is composed of high-strength protective armor and a buffer armor device, which is installed at the pressing station. When an explosion occurs during the pressing process, it can effectively prevent explosion and relieve pressure, block the explosion energy transmission, isolate other stations, and protect other workplace stations equipment safety;

The cleaning unit is composed of a tooling mold cleaning device and a perforating charge cleaning device. The tooling mold cleaning device is composed of a convex mold cleaning device, a concave mold cleaning device, a centralizing sleeve cleaning device, a middle mold cleaning device, a platform cleaning device and an explosion-proof particle cleaning device. The tooling mold cleaning device can effectively remove the floating charge at the tooling mold and the tooling platform, and the perforating charge cleaning device uses an anti-static copper sheet to rotate and scrape the residual charge and anti-static charge at the mouth of the perforating charge. The electrostatic brush scrubs the projectile body, the clamping and rotating mechanism clamps the perforating bullet and positions it precisely, the self-adaptive scraper is positioned at the edge of the mouth, the perforating bullet rotates to scrape off the residual drug at the edge of the mouth, and then uses the explosion-proof dust suction method to scrape off The floating powder is collected to realize the cleaning of the edge of the large mouth and the cleaning of the surface of the projectile;

The glue coating unit at the mouth of the perforating bullet is composed of a glue supply system, a needle rotation mechanism, an electrical control system, a pneumatic system, the equipment body, equipment accessories, and an anti-curing mechanism. The gluing unit applies glue to the side of the perforating bullet. The process standard meets the temperature resistance requirements of the perforating bullet sealing glue. The glue application efficiency meets the production capacity requirements of the whole line. The anti-curing mechanism solves the problem of glue coating during the intermission of the production line. The problem of glue curing at the mouth can be solved, and continuous automatic glue application can be realized;

The product QC intelligent IA inspection unit of the product uses machine vision inspection technology to develop an online non-destructive inspection device based on image information and optical principles for the surface quality and shape and position accuracy of perforating bullet materials and finished products. The product QC intelligent IA inspection unit consists of pharmaceutical The product QC intelligent IA inspection unit of the product uses a smart camera to take pictures of the perforating charge at the edge of the mouth and the liner on the inner wall, and identifies whether the inner wall of the perforating ammunition is cleaned or not, and whether there are cracks, the liner is pressed in, and the mouth of the perforating bullet is cleaned or not;

The product placement unit is composed of a gantry palletizer, grabbing tooling and a material tray positioning mechanism. When the empty tray is transported and positioned by the tray conveying line, the perforating charges after the inspection by the product QC intelligent IA inspection unit and the gantry palletizer grabs it and puts it into an empty pallet, and then it is output by the conveyor line to the explosion-proof armored warehouse passing through the wall and waits to exit the explosion-proof pressing room;

The interlocking unit of the explosion-proof isolation warehouse is composed of an explosion-proof isolation warehouse, a conveying mechanism, a fixed push-pull mechanism and an interlock control system. When the explosion-proof isolation warehouse is working, the double-layer transfer window is opened and closed. Windows, conveying, window closing and other functions meet the safety requirements of work room isolation and complete the transfer and transportation of materials in the explosion-proof wall.

Preferably, the technological action steps of the automatic weighing unit for explosives are: identifying pallet information→adjusting parameters→automatic weighing→shell state detection→shell state adjustment→first row of explosives→second row of explosives→weighing and filling process is complete.

Preferably, the process action steps of the material conveying unit are: empty shell tray conveying—low-speed stepping charge conveying→low-speed steady output-jacking and lateral shifting steering—(waiting for opening the explosion-proof transfer window on the side of the weighing room→passing the explosion-proof Warehouse→close the explosion-proof transfer window on the side of the weighing room→open the explosion-proof transfer window on the press room side→the shell tray enters the explosion-proof press room→close the explosion-proof transfer window on the side of the press room)—the shells are transported to the robot assembly station smoothly at low speed;

Shells and cover trays enter the weighing room→(automatically weigh charge)→shells and cover trays enter the pressing room→shells and cover trays enter the assembly point→(robot takes shells and covers)→empty trays enter perforating charges packing point→(automatic packing)→perforating charge tray output pressing room.

Preferably, the technological action steps of the special hydraulic press for perforating bullets are: pressing preparation→rapid downward movement of the slider→slow pressing→pressure maintaining of the slider→slow return of the slider→fast return of the slider→upper stamping cleaning→cylinder jacking Eject out→complete a single cycle;

The process action steps of the explosion-proof robot are: the shell tray enters the assembly point→the robot visually locates the position of the shell and the drug cover→grabs the shell and absorbs the cover→puts the shell into the shell release of the multi-station pressing platform Work station→put the drug-type cover into the cover position→cycle the previous action;

The process action steps of the AI positioning system are: positioning the drug-type cover→absorbing the drug-type cover→locating the drug shell→closing the clamping cylinder→lifting and moving→moving to the shell release station of the multi-station pressing platform→opening the clamping cylinder→Move to the cover position→put down the medicine cover;

The technological action steps of the multi-station press assembly platform are: the technological action of each station is completed→the platform rises→the platform rotates 60 degrees→the platform descends→the platform is positioned and locked→the technological action of each station→cyclic operation;

The technological action steps of the picking and placing mechanism of the centralizing sleeve and the drug-type cover are: (pressing platform to take the bomb station)→grab the centralizing sleeve→move to the cleaning position of the centralizing sleeve→clean the centralizing sleeve→grab the centralizing sleeve→move to the release position Righting the sleeve→vertically put the righting sleeve; absorb the drug-shaped cover→move to the cover position→put it vertically→cycle the next action;

Absorb the drug-shaped cover→move to the release position→put it vertically→cycle the next action;

The technological action steps of the ring-shaped synchronous conveying line are: placing perforating charges→cleaning the edge of the mouth→cleaning the projectile body→inspecting the appearance of the projectile→applying glue on the edge of the mouth→checking the appearance of the glue application→removing the perforating charges.

Preferably, the technical action steps of the tooling for suppressing the fire prevention and alarm system are: the cleaning mechanism is in place→the middle mold is ejected→the cleaning mechanism rotates, positive pressure and negative pressure work alternately→the middle mold is retracted→the cleaning mechanism is retracted.

Preferably, the process action steps of the tooling mold cleaning device are: punch cleaning: slider return→punch passes through the cleaning area→anti-static brush and vacuum cleaning→return to the origin cycle;

Die/middle mold/platform cleaning: enter the center of the mold and platform→cover around the mold and platform→anti-static brush and vacuum cleaning→return to the origin cycle.

Preferably, the technological action steps of the perforating charge cleaning system are: cleaning the position at the mouth of the charge→positioning and clamping the perforating charge→aligning the self-adaptive scraper to the edge of the large hole→rotating the perforating charge→vacuuming with negative pressure→releasing Perforating bullet→enter the next link;

The cleaning position of the perforating charge→positioning and clamping of the perforating charge→covering the perforating charge→positive pressure flushing→negative pressure vacuuming→detaching from the perforating charge→loosening the perforating charge→entering the next link.

Preferably, the technological action steps of the gluing unit at the mouth of the perforating charge are: gluing process: perforating charge gluing position→perforating charge positioning and clamping→gluing→loosening the perforating charge→enter the next link;

Anti-curing process: no products at the first 10 stations→enter the anti-curing mode→return the dispensing head to the anti-curing position→immerse the dispensing head in the anti-curing agent→wait for production.

Preferably, the technological action steps of the product QC intelligent IA inspection unit are: the perforating bullet enters the appearance inspection station→visual photography→online analysis.

Preferably, the process action steps of the product arranging unit are: transporting the empty tray to the position→grabbing the perforating bullet→putting it into the empty tray→transporting it to the explosion-proof armored warehouse passing through the wall.

Preferably, the process action steps of the interlocking unit of the explosion-proof isolation warehouse are: the explosion-proof transfer window on both sides is closed→the explosion-proof transfer window on one side is opened→the material enters the intermediate warehouse→the explosion-proof transfer window on this side is closed→the explosion-proof transfer window on the other side is opened Window→material out of the intermediate warehouse→close the explosion-proof transfer window on this side.

Compared with the prior art, the present invention has the following beneficial effects:

1. In the present invention, by setting the explosive automatic weighing unit, the material conveying unit, the perforating bullet multi-station automatic pressing assembly unit, the tooling pressing fire prevention and alarm unit, the explosion-proof armor unit, the cleaning unit, and the glue coating on the mouth of the perforating bullet unit, product QC intelligent IA inspection unit, product placement unit and explosion-proof isolation warehouse interlocking unit, complete the explosive weighing, loading, material transportation, automatic assembly, multi-station pressing, safety protection, mold cleaning, and shooting of perforating bombs. Perforating bullet cleaning, cleaning, perforating bullet glue coating, product QC intelligent IA inspection, product arranging, and finished product delivery constitute the manufacturing flow operation of perforating bullet production, and realize the unmanned manufacturing of perforating bullets, special equipment for new perforating bullet manufacturing and intelligent equipment system integration and other key technologies.
2. In the present invention, the production area is divided into three areas: the safety area, the explosion-proof weighing room and the explosion-proof pressing room by setting up an explosion-proof isolation chamber to complete the intrinsically safe intelligent manufacturing safety design of perforating bullets, forming a layout of equipment that matches the automated manufacturing process security policies and process controls.
3. In the present invention, through the development of an intrinsically safe fast and high-precision weighing system, combined with the explosion conditions of the weighing process, the detonation factors of the weighing process are analyzed, and means for suppressing ignition source energy such as electric sparks and thermal effects are proposed, and the design is intrinsically safe and the type weighing module meets the high-precision and accurate weighing of explosives in the production process of perforating bullets. The explosive anti-splash device and righting device are installed in the weighing machine to ensure the safety of the weighing and charging process of the shell.
4. In the present invention, the material conveying unit has the advantages of anti-static, stable conveying, compact line body, low transmission noise, etc., and meets the requirements for stable conveying of material pallets with bulk explosives between stations in the explosion-proof pressing room.
5. In the present invention, the isolation device and fire extinguishing material are arranged around the pressing tooling mold, which can realize fire prevention actions such as closing, blocking, isolating, flame retardant, energy absorbing, and covering, forming passive fire extinguishing protection, and triggering alarm information in time to meet the requirements for pressing explosion safety explosion-proof and fire-proof to prevent the spread of danger.
6. In the present invention, the explosion-proof armor system is composed of high-strength protective armor and a buffer armor device, which is installed at the pressing station. When an explosion occurs during the pressing process, it can effectively block the explosion and relieve pressure, block the explosion energy transmission, and isolate other workers. position, to protect the safety of other station equipment.

DESCRIPTION OF DRAWINGS

In order to more clearly illustrate the technical solutions of the embodiments of the present invention, the following will briefly introduce the attached drawings that are required for the description of the embodiments. Obviously, the attached drawings in the following description are only some embodiments of the present invention. Those of ordinary skills in the art can also obtain other drawings based on these drawings without any creative effort.

Figure 1:
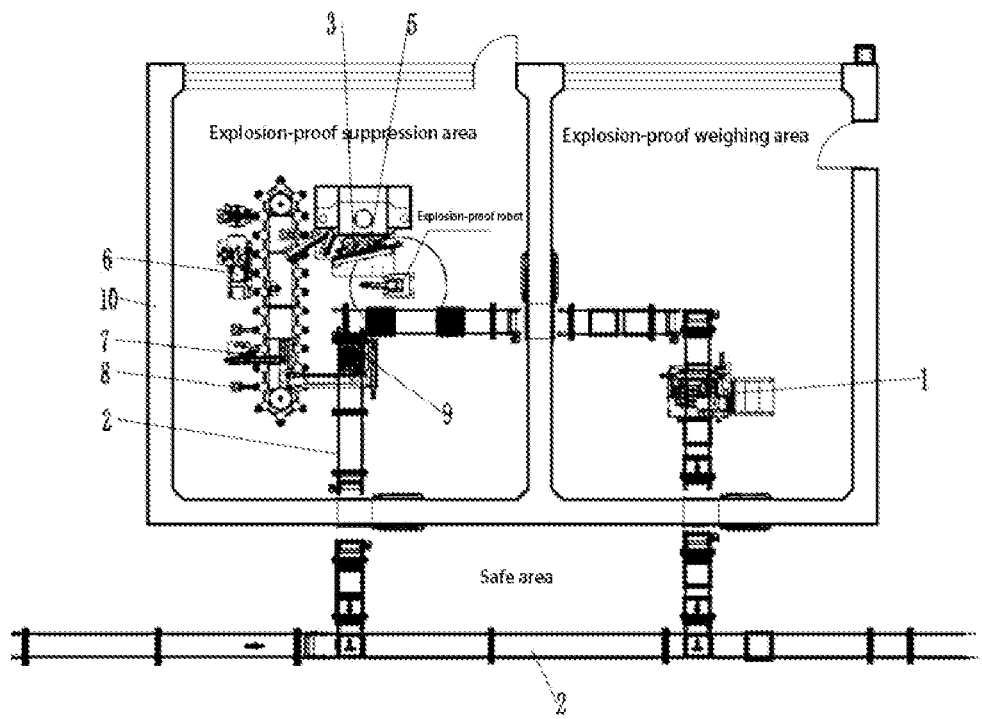
FIG. 1 It is a schematic diagram of the overall structure of a perforating charge intrinsically safe intelligent manufacturing system of the present invention.

In the FIG. 1. Explosive automatic weighing unit; 2. Material conveying unit; 3. Perforating bullet multi-station automatic pressing assembly unit; 4. Loading and pressing fire prevention and alarm unit; 5. Explosion-proof armor unit; 6. Cleaning unit; 7. Glue coating unit on the mouth of perforating bullets; 8. Product QC intelligent IA inspection unit; 9. Product arranging unit; 10. Interlocking unit of explosion-proof isolation chamber.

DETAILED WAYS

In order to make the technical means, creative features, goals and effects achieved by the present invention easy to understand, the present invention will be further described below in conjunction with specific embodiment.

In the description of the present invention, it should be noted that the terms "upper", "lower", "inner", "outer", "front end", "rear end", "both ends", "one end", "another end" The orientation or positional relationship indicated by etc. is based on the orientation or positional relationship shown in the drawings, and is only for the convenience of describing the present invention and simplifying the description, rather than indicating or implying that the referred device or element must have a specific orientation, use a specific azimuth configuration and operation, therefore, should not be construed as limiting the invention. In addition, the terms "first" and "second" are used for descriptive purposes only, and should not be understood as indicating or implying relative importance.

In the description of the present invention, it should be noted that, unless otherwise specified and limited, the terms "installed", "set with", "connected", etc. should be understood in a broad sense, such as "connected", which may be a fixed connection, can also be detachably connected, or integrally connected; can be mechanically connected, can also be electrically connected; can be directly connected, can also be indirectly connected through an intermediary, and can be internal communication between two components. Those of ordinary skills in the art can understand the specific meanings of the above terms in the present invention in specific situations.

The technical solution of the present invention will be further described below in conjunction with the accompanying drawings.

Figure 2:
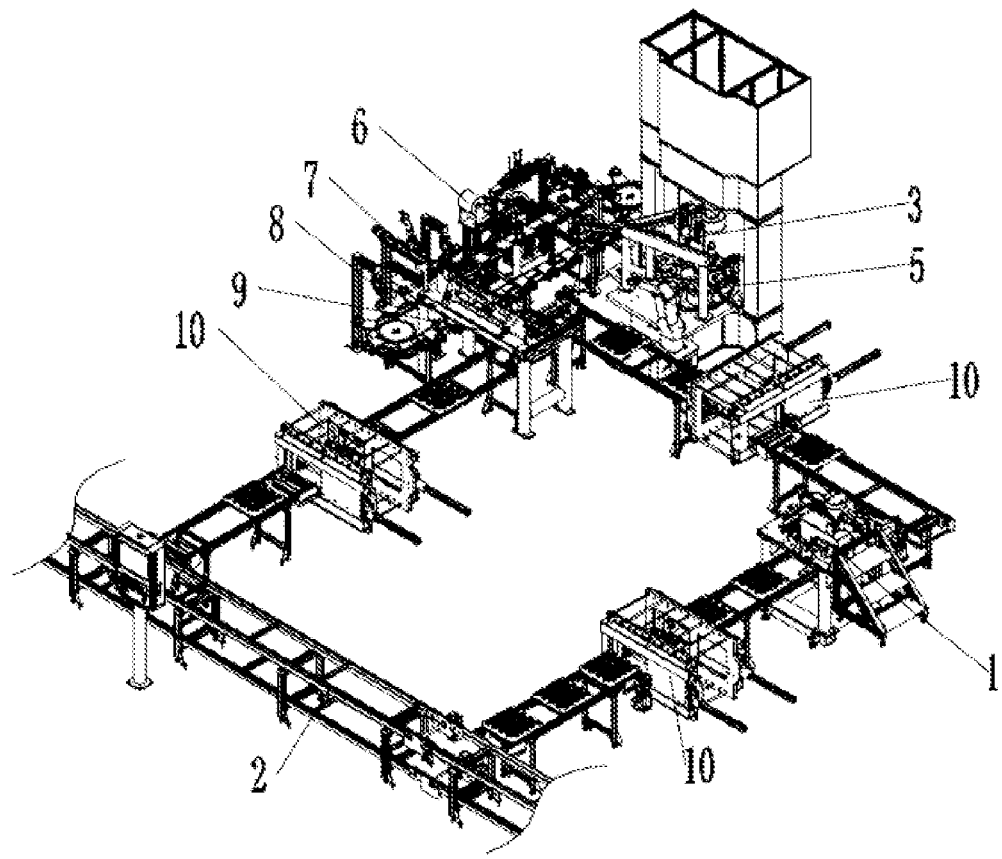
FIG. 2 It is a three-dimensional structural schematic diagram of an intrinsically safe intelligent manufacturing system for perforating bullets according to the present invention.

Embodiment One like FIG. 1-FIG. 2 As shown, an intrinsically safe intelligent manufacturing system for perforating bullets includes an automatic explosive weighing unit 1, a material conveying unit 2, a multi-station automatic pressing assembly unit 3 for perforating bullets, a tooling pressing fire prevention and alarm unit 4, and an explosion-proof armor unit 5, cleaning unit 6, glue coating unit 7 at the mouth of perforating bullets, product QC intelligent IA inspection unit 8, product arranging unit 9 and explosion-proof isolation warehouse interlocking unit 10;

The explosive automatic weighing unit 1 is composed of a material hopper, a drug guide device, a composite servo feeding and conveying device, a charging mechanism, a high-precision weighing and measuring device, a temporary storage hopper, a position conversion device, a charging channel, a waste collection hopper, a powder anti-splash device, to realize the precise measurement, servo feeding and explosion-proof treatment technology of the automatic weighing process of granular dangerous goods;

The material conveying unit 2 is composed of a low-speed explosion-proof double-speed conveying line, a jacking and traversing mechanism, an explosion-proof drive unit and electrical control. The material conveying unit 2 is responsible for transporting the automatically weighed and loaded explosive shell of the explosive automatic weighing unit 1 to the explosion-proof robot assembly position in the multi station automatic pressing assembly unit 3 of the perforating bullets;

The multi-station automatic pressing and assembly unit 3 of the perforating charges is composed of a specialized hydraulic press for perforating charges, an explosion-proof robot, an AI positioning system, a multi-station pressing and assembly platform, a centering sleeve and a loading and unloading mechanism for the drug type cover, and a circular synchronous conveying line. It is used to grab the drug shell and the drug type cover from the material tray, place them at the corresponding tooling mold according to the assembly process flow, and also for assembly processes such as placement, loading, and removal of the centralizing sleeve. The AI positioning system is used to identify the positions of drug shells and drug type covers, guide robots to accurately locate, grasp, and place drug case and drug type covers. The multi-station press assembly platform is composed of a high-precision rotating disc, a high-precision pressing assembly workbench, a platform lifting mechanism, and a composite secondary positioning mechanism. The multi-station pressing platform is installed on the side of the workbench of a special hydraulic press for perforating charges, and the position conversion of various assembly processes before the press process is completed through the platform lifting and rotating stations. The multi-station pressing platform is equipped with stations such as upper putting the centralizing sleeve, cover placement, pressing, ammunition retrieval, and cleaning. Each workstation is equipped with molds, diemolds, and middle molds to achieve automated and assembly line continuous pressing production. The pick-and-place mechanism of the centralizing sleeve and the drug-type cover is composed of an explosion-proof servo module, an explosion-proof servo motor, a driver, a guiding and positioning device, and a clamping mechanism. The pick-and-place mechanism of the centralizing sleeve and the drug-type cover grabs the centralizing sleeve from the ammunition retrieval station of the multi station pressing platform and places it in the position of the cleaning mechanism. After the cleaning is completed, the centralizing sleeve is moved to the multi-station pressing platform to put the centralizing sleeve station. The pick-and-place mechanism of the centralizing sleeve and the drug-type cover is also responsible for taking out the drug-type cover, waiting for the centralizing sleeve to be in place, and placing the drug-type cover into the shell case. Multiple workstations are set on the annular synchronous conveyor belt to complete various processes of the large mouth edge of perforating bullets, such as edge cleaning, cleaning, body appearance inspection, and glue coating;

The tool pressing fire prevention and alarm unit 4 is composed of an isolation device, fire extinguishing material and alarm device, and the isolation device and fire extinguishing material are arranged around the pressing tool mold, which can realize closing, blocking, isolation, flame retardant, energy absorption, covering, fire prevention action, forming passive fire protection, and triggering alarm information in time;

The explosion-proof armor unit 5 is composed of high-strength protective armor and a buffer armor device, and is arranged at the pressing station. When an explosion occurs in the pressing process, it can effectively block the explosion and relieve pressure, block the explosion energy transmission, isolate other stations, and protect safety of other workplace equipment;

The cleaning unit 6 is composed of a tooling mold cleaning device and a perforating charge cleaning device. The tooling mold cleaning device is composed of a punch cleaning device, a concave mold cleaning device, a centralizing sleeve cleaning device, a middle mold cleaning device, a platform cleaning device and an explosion-proof cleaning device. The tooling mold cleaning device can effectively remove the floating charge at the tooling mold and the tooling platform, and the perforating charge cleaning device uses an anti-static copper sheet to rotate and scrape the residual charge and the anti-static brush scrubs the projectile, the clamping and rotating mechanism clamps the perforating bullet and positions it precisely, the self-adaptive scraper is positioned at the edge of the mouth, the perforating bullet rotates to scrape off the residual drug at the edge of the mouth, and then uses the explosion-proof dust suction method to scrape the bullet The falling floating powder is collected to realize the cleaning of the edge of the big mouth and the cleaning of the surface of the projectile;

The glue coating unit 7 at the mouth of the perforating bullets is composed of a glue supply system, a needle rotation mechanism, an electrical control system, a pneumatic system, the equipment body, equipment accessories, and an anti-curing mechanism. After the mouth of the perforating bullets is cleaned, the glue coating unit 7 applies glue to the side of the perforating bullets mouth. The process standard meets the temperature resistance requirements of the perforating bullets sealing glue, and the glue application efficiency meets the production capacity requirements of the entire line. The problem of glue curing at the glue application port can be solved and the continuous automatic glue application can be realized;

The product QC intelligent IA inspection unit 8 uses machine vision inspection technology to develop an online non-destructive testing device based on image information and optical principles for the surface quality and shape and position accuracy of perforating bomb materials and finished products. The product QC intelligent IA inspection unit 8 is composed of the inner wall detection mechanism of the liner cover and the mouth edge detection mechanism. The QC intelligent IA inspection unit 8 of the product takes pictures of the mouth edge of the perforating charge and the liner on the inner wall through the smart camera, and identifies the type of perforating ammunition according to the pictures whether there are cracks on the inner wall of the cover, whether the medicine cover is pressed in, and whether the mouth of the perforating charge is cleaned or not;

The product placement unit 9 is composed of a gantry palletizer, grabbing tooling device and a material tray positioning mechanism. After the empty tray is transported and positioned by the tray conveying line, the product QC intelligent IA inspection unit 8 inspects the completed perforation. The bullets are picked up by the gantry palletizer and put into the empty pallet, and then output by the conveying line to the explosion-proof armored warehouse passing the wall and waiting to exit the explosion-proof pressing room;

During the operation of the explosion-proof isolation warehouse, the double layer transfer window is opened and closed, and the functions of opening, conveying, and closing the window during the material transfer process through the wall meet the safety requirements of workplace isolation, completing the transfer and transportation of materials through the explosion-proof wall.

The interlocking unit 10 of the explosion-proof isolation warehouse is composed of an explosion-proof isolation warehouse, a conveying mechanism, a fixed push-pull mechanism and an interlock control system. During the operation of the explosion-proof isolation warehouse, the double layer transfer window is opened and closed, and the functions of opening, conveying, and closing the window during the material transfer process through the wall meet the safety requirements of workplace isolation, completing the transfer and transportation of materials through the explosion-proof wall.

Further, the technological action steps of the explosive automatic weighing unit 1 are: identifying pallet information→adjusting parameters→automatic weighing→shell state detection→shell state adjustment→first row of charges→second row of charges→weighing and charging process is complete.

Further, the technological action steps of the material conveying unit 2 are: empty shell tray conveying—low-speed stepping charge conveying→low-speed steady output-jacking and lateral shifting steering—(wait for opening the explosion-proof transfer window on the side of the weighing room→overexplosion-proof warehouse→close the explosion-proof transfer window on the side of the weighing room→open the explosion-proof transfer window on the press room side→the shell tray enters the explosion-proof press room→close the explosion-proof transfer window on the side of the pressing room)—the shells are transported to the robot assembly station smoothly at low speed;

Shells and cover trays enter the weighing room→(automatically weigh charge)→shells and cover trays enter the pressing room→shells and cover trays enter the assembly point→(robot takes shells and covers)→empty trays enter perforating charges packing point→(automatic packing)→perforating charge tray output pressing room.

Further, the technological action steps of the special hydraulic press for perforating bullets are: pressing preparation→rapid downward movement of the slider→slow pressing→pressure maintaining of the slider→slow return of the slider→fast return of the slider→upper stamping cleaning→jacking cylinder eject out→complete a single cycle;

The technological action steps of the explosion-proof robot are: the shell tray enters the assembly point→the robot visually locates the position of the shell and the drug cover→grabs the shell and absorbs the cover→puts the shell into the shell placement station of the multi-station pressing platform→put the drug-type cover into the cover position→cycle the previous action;

The technological action action steps of the AI positioning system are: positioning the drug-type cover→absorbing the drug-type cover→locating the drug shell→closing the clamping cylinder→lifting and moving→moving to the shell release station of the multi-station pressing platform→opening the clamping cylinder→moving to the cover position→put down the medicine cover;

The technological action steps of the multi-station press assembly platform are: the technological action of each station is completed→the platform rises→the platform rotates 60 degrees→the platform descends→the platform is positioned and locked→the technological action of each station→cyclic operation;

The technological action steps of the picking and placing mechanism of the centralizing sleeve and the drug-type cover are: (pressing platform to take the ammunition retrieval station)→grab the centralizing sleeve→move to the cleaning position of the centralizing sleeve→clean the centralizing sleeve→grab the centralizing sleeve→move to the release position of the centralizing sleeve→vertically place the centralizing sleeve; absorb the drug-shaped cover→move to the cover position→put it vertically→cycle the next action;

Absorb the drug-shaped cover→move to the release position→put it vertically→cycle the next action;

The technological action steps of the ring-shaped synchronous conveying line are: placing perforating charges→cleaning the edge of the mouth→cleaning the projectile body→inspecting the appearance of the projectile→applying glue on the edge of the mouth→checking the appearance of the glue application→removing the perforating charges.

Further, the technical action steps of the tool pressing fire protection and alarm system 4 are: the cleaning mechanism is in place→the middle mold is ejected→the cleaning mechanism rotates, positive pressure and negative pressure work alternately→the middle mold is retracted→the cleaning mechanism is retracted.

Further, the technological action steps of the tooling mold cleaning device are: die cleaning: slider return→die passes through the cleaning area→anti-static brush and vacuum cleaning→return to the origin cycle;

Die/middle mold/platform cleaning: enter the center of the mold and platform→cover around the mold and platform→anti-static brush and vacuum cleaning→return to the origin cycle.

Preferably, the technological action steps of the perforating charge cleaning system are: cleaning the position at the mouth of the charge→positioning and clamping the perforating charge→aligning the self-adaptive scraper to the edge of the large hole→rotating the perforating charge→vacuuming with negative pressure→releasing the perforating charge→enter the next link;

The cleaning position of the perforating charge→positioning and clamping of the perforating charge→covering the perforating charge→positive pressure flushing→negative pressure vacuuming→detaching from the perforating charge→loosening the perforating charge→entering the next link.

Further, the technological action steps of the glue coating unit 7 at the mouth of the perforating charge are as follows: glue application process: glue coating position of the perforating bullet→positioning and clamping of the perforating bullet→glue application→loosening the perforating bullet→enter the next step links Anti-curing process: no products at the first 10 stations→enter the anti-curing mode→return the dispensing head to the anti-curing position→immerse the dispensing head in the anti-curing agent→wait for production.

Further, the technological action steps of the product QC intelligent IA inspection unit 8 are: the perforating charge enters the appearance inspection station→visual photography→online analysis.

Further, the technological action steps of the product arranging unit 9 are: transport the empty tray to the position→grab the perforating charges→put them into the empty tray→transport to the explosion-proof armored warehouse passing through the wall.

Further, the technological action steps of the interlocking unit 10 of the explosion-proof isolation warehouse are: the explosion-proof transfer window on both sides is closed→the explosion-proof transfer window on one side is opened→the material enters the intermediate warehouse→the explosion-proof transfer window on this side is closed→the explosion-proof transfer window on the other side is opened→material out of the intermediate warehouse→close the explosion-proof transfer window on this side.

In this embodiment, by setting explosive automatic weighing unit 1, material conveying unit 2, perforating bullets multi-station automatic pressing assembly unit 3, tooling pressing fire prevention and alarm unit 4, explosion-proof armor unit 5, cleaning unit 6, the glue coating unit 7 of the perforating bullets on the large mouth edge, the product QC intelligent IA inspection unit 8, the product swing unit 9 and the explosion-proof isolation warehouse interlock unit 10 complete the explosive weighing, loading, material transportation, automatic assembly, and multi-station of the perforating bullets pressing, safety protection, mold cleaning, perforating charge cleaning, cleaning, perforating charge gluing, product QC intelligent IA inspection, product arranging, finished product delivery, constitute the manufacturing flow operation of perforating charge production, and realize unmanned perforating charge key technologies such as special equipment for the manufacture of new perforating bullets and intelligent equipment system integration.

The basic principles and main features of the present invention and the advantages of the present invention have been shown and described above. The technicians in the industry should understand that the present invention is not limited by the above-mentioned embodiment. What are described in the above-mentioned embodiment and the description only illustrate the principle of the present invention. Without departing from the spirit and scope of the present invention, the present invention will also have variations and improvements are possible, which fall within the scope of the claimed invention. The protection scope of the present invention is defined by the appended claims and their equivalents.

The invention claimed is:

1. The intrinsically safe intelligent manufacturing system for perforating bullets, it is characterized by: including explosives automatic weighing unit (1), material conveying unit (2), perforating charge multi-station automatic pressing assembly unit (3), tooling pressing fire protection and alarm unit (4), explosion-proof armor unit (5), cleaning unit (6), perforating bullet mouth side glue coating unit (7), Product digital intelligent information detection unit (8), product placement unit (9), explosion-proof isolation chamber interlocking unit (10);

The explosive automatic weighing unit (1) is composed of a material hopper, a drug guiding device, a composite servo feeding and conveying device, a charging mechanism, a high-precision weighing and measuring device, a temporary storage hopper, a position switching device, a charging channel, and a waste collection hopper, powder anti-splash device, The explosive automatic weighing unit (1) is used to realize the precise measurement, servo feeding, and explosion-proof treatment technology of the automatic weighing process of granular dangerous goods;

The material conveying unit (2) is composed of a low-speed explosion-proof double-speed conveying line, a jacking and traversing mechanism, an explosion-proof drive unit and an electrical control unit; The material conveying unit (2) is responsible for transporting the fully loaded explosive shell from the automatic weighing unit (1) to the explosion-proof robot assembly position in the multi station automatic compression assembly unit (3) of the perforating charge;

The perforating bullets multi-position automatic pressing assembly unit (3) consists of a special hydraulic press for perforating charges, an explosion-proof robot, an AI positioning system, a multi-position pressing assembly platform, a pick-and-place mechanism for a centralizing sleeve and a liner, and a circular synchronous conveying line; The perforating bullets multi-position automatic pressing assembly unit (3) It is used to grab the drug shell and liner from the material tray, place them on the corresponding tooling mold according to the assembly process, and is also used for the assembly process of placing, transferring, and taking out the righting sleeve; The AI positioning system is used to identify the position of the drug case and liner, and guide the robot to accurately locate and place the drug case and liner; Composed of lifting mechanism and composite secondary positioning mechanism, the multi-station pressing platform is installed on the side of the workbench of the special hydraulic press for perforating charges, and the position conversion of various assembly processes before the pressing process is completed through platform lifting and rotating stations; The multi-station pressing platform is equipped with stations such as upper casing, setting of the centralizing sleeve, placing of the cover, pressing, removing bombs and cleaning; Each station is equipped with a mold, a die, and a middle mold to realize automatic and assembly line continuous pressing production; The picking and placing mechanism of the centralizing sleeve and the liner is composed of an explosion-proof servo module, an explosion-proof servo motor, a driver, a guiding and positioning device, and a clamping mechanism; The bullet-taking station grabs the centralizing sleeve and places it in the position of the cleaning mechanism; After the cleaning is completed, the centralizing sleeve is moved to the multi-station pressing platform to put the centralizing sleeve station, after waiting for the centering sleeve to be in place, place the liner cover in the shell, and set multiple stations on the circular synchronous conveyor belt;

The tool press fire prevention and alarm unit (4) is composed of an isolation device, a fire extinguishing material and an alarm device; The isolation device and the fire extinguishing material are arranged around the pressing tool mold to realize closure, blocking, isolation, flame retardancy, energy absorption, Covering and other fire prevention actions form passive fire protection and trigger alarm information in time;

The explosion-proof armor unit (5) is composed of high-strength protective armor and a buffer armor device, and is arranged at the pressing station; When an explosion occurs during the pressing process, it can effectively prevent explosion and relieve pressure, block the explosion energy transmission, and isolate other stations, to protect the safety of other workstations equipment;

The cleaning unit (6) is composed of a tooling mold cleaning device and a perforating charge cleaning device, and the tooling mold cleaning device is composed of a convex mold cleaning device, a concave mold cleaning device, a centralizing sleeve cleaning device, a middle mold cleaning device, and a platform cleaning device Composed of an explosion-proof particle collection device;

The glue coating unit (7) at the mouth of the perforating charge is composed of a glue supply system, a needle rotation mechanism, an electrical control system, a pneumatic system, the equipment body, equipment accessories, and an anti-curing mechanism; After the mouth of the perforating bullet is cleaned, the glue coating unit (7) applies glue to the mouth of the perforating bullet; The process standard meets the temperature resistance requirements of the perforating bullet sealing glue, and the glue application efficiency meets the production capacity requirements of the entire line; The anti-curing mechanism solves the problem of the production line, the glue curing problem at the glue application port during the intermission to achieve continuous automatic glue application;

The Product digital intelligent information detection unit (8) utilizes machine vision detection technology to develop an online non-destructive testing device image information and optical principles for the surface quality and shape accuracy of perforating bullet materials and finished products; The Product digital intelligent information detection unit (8) is composed of the inner wall detection mechanism of the liner and the mouth edge detection mechanism; The QC intelligent IA inspection unit (8) of the product uses a smart camera to take pictures of the mouth edge of the perforating charge and the liner on the inner wall; According to the picture Identify whether there are cracks on the inner wall of the perforating ammunition cover, whether the liner is pressed in, and whether the mouth of the perforating charge is clean;

The product arranging unit (9) is composed of a gantry palletizer, grabbing tooling and a material tray positioning mechanism; After the empty tray is transported and positioned by the tray conveyor line, it is inspected by the Product digital intelligent information detection unit (8); The final perforating bullets are picked up by the portal palletizer and put into the empty pallet, and then output by the conveying line to the explosion-proof armored warehouse passing the wall and waiting to exit the explosion-proof pressing room;

The interlock unit (10) of the explosion-proof isolation warehouse is composed of an explosion-proof isolation warehouse, a conveying mechanism, a fixed push-pull mechanism and an interlock control system; The functions of window opening, conveying, and window closing meet the safety requirements of work room isolation and complete the transfer and transportation of materials in the explosion-proof wall.

* * * * *